April 23, 1940. D. S. BARROWS 2,197,783
SIDE BEARING
Filed March 25, 1939 4 Sheets-Sheet 1

Inventor
DONALD S. BARROWS
By Ernest S. Mechlin
his Attorney

April 23, 1940. D. S. BARROWS 2,197,783
SIDE BEARING
Filed March 25, 1939 4 Sheets-Sheet 2

Inventor
DONALD S. BARROWS
By Ernest P. Mechlin
his Attorney

Inventor
DONALD S. BARROWS

April 23, 1940.   D. S. BARROWS   2,197,783
SIDE BEARING
Filed March 25, 1939   4 Sheets-Sheet 4

Inventor
DONALD S. BARROWS
By Ernest P. Mechlin
his Attorney

Patented Apr. 23, 1940

2,197,783

UNITED STATES PATENT OFFICE 2,197,783

SIDE BEARING

Donald S. Barrows, Rochester, N. Y., assignor to The Symington-Gould Corporation, Rochester, N. Y., a corporation of Maryland Application March 25, 1939, Serial No. 264,229

22 Claims. (Cl. 308—138)

This invention relates to a cushioning unit and more particularly to a side bearing for railway vehicles.

An object of the invention is to provide a side bearing of compact and simple construction to effectively cushion or absorb stresses or shocks transmitted thereto by a body bolster of a railway vehicle.

A further object of the invention is to arrange shoes and coil springs in a side bearing so as to resiliently and frictionally resist the compressive movement of the side bearing.

An additional object of the invention is the provision, in a side bearing, of a housing having a cap movably associated with one end thereof and means within the housing to resist a downward or vertical movement of the cap with respect to the housing; the cap being constructed and arranged with the means in such a manner that it is retained out of contact with the housing during any movement thereof and thereby prevents abrasion of the housing or the development of forces other than those intended.

A feature of the invention is to provide a side bearing having a housing open at one end and accommodating longitudinally spaced friction members or shoes which are urged outwardly of the housing by resilient or spring means and longitudinally into bearing relation with the housing by additional spring means so that, upon relative movement between the friction shoes and housing, frictional forces will be created to increase the compressive value of the side bearings.

Another feature of the invention is to provide a side bearing with a plurality of vertically movable cup-shaped friction blocks having coil or helical springs positioned therein to urge them outwardly of the housing and additional coil or helical springs arranged to urge the blocks longitudinally of the side bearing into engagement with the housing, a cap normally overlying the housing in spaced relation thereto, and transversely extending means projecting through the housing and cap to retain the elements of the side bearing in assembled relation.

A further feature of the invention is the provision of cylindrical end walls in a side bearing housing and correspondingly formed wear plates secured to each end wall, cylindrically formed shoes associated with the wear plates having spring means reacting against the housing and shoes for urging the latter outwardly of the former, and a cap having a portion thereof normally spaced above the housing and bearing upon the shoes for urging the shoes inwardly of the housing during a compressive movement of the side bearing; the cap having a pendant means extending to within the housing between the shoes and provided with angularly disposed apertures one of which accommodates a longitudinally acting resilient means forcing the shoes apart into intimate contact with the wear plates and the other of which accommodates a transversely extending means which has ends thereof removably associated with the housing to retain the elements of the side bearing in assembled relation.

An additional feature of the invention is the provision of convex or crowned surfaces on the friction blocks or shoes which form bearings for the side bearing cap, and with this arrangement the cap may freely assume an angular or abnormal relation with respect to the subjacent housing to accommodate any variation therebetween during service without diminishing the effectiveness of the side bearing.

These and numerous other objects and features of the invention will become apparent from the succeeding detailed description of the exemplified forms of the invention which are illustrated in various figures in the accompanying drawings wherein.

Referring now in detail to the first embodiment of the invention illustrated in Figures 1 to 4 of the drawings, wherein like reference characters designate like parts, the numeral 1 indicates a side bearing embodying a construction and relation of elements illustrative of the present invention. The side bearing desirably comprises a housing or casing 2 partially hollow in form and having a horizontal bottom or lower plate 3 providing securing or attaching ears 4 apertured, as at 5, to accommodate rivets, bolts or any other such means desired. The bottom plate is adapted to be removably secured to the top portion of a truck bolster (not shown). Upstanding from the bottom plate of the housing are longitudinally spaced substantially vertical end walls 6 which are joined together adjacent their extremities by transversely spaced vertically extending side walls 7 defining a space therebetween which opens upwardly and forms a confining receptacle for associated elements to be hereinafter described. Triangular-shaped gussets 8 are formed integrally with the lower plate and side walls to rigidify the casing.

Positioned adjacent the lower extremity of the side walls intermediate their ends are elongated apertures 9 which assist in lightening the housing and form outlets for the escape of any foreign substance which may find its way to the interior of the side bearing.

Positioned within the housing in longitudinally spaced relation are vertically movable counterpart friction members, blocks or shoes 10, preferably of hollow or inverted cup-shaped formation, each of which has an upper, horizontal, apertured, closing wall 11 of lesser width than the distance between the adjacent and transversely spaced side walls so as to permit the free unrestricted movement of the shoes in a vertical direction, inwardly and outwardly of the housing.

Extending downwardly or vertically from adjacent the edges of each shoe closing wall is a peripheral, preferably continuous, depending flange 12 which, when the shoes are in normal position, terminates short of the housing bottom wall to thereby permit a compressive movement of the side bearing and consequently a downward vertical movement of the shoes. Each shoe or block flange has, on one or an outer side thereof, a substantially plane surface 13 in intimate contact or bearing relation with a correspondingly formed plane surface 14 provided on the inner side of each end wall 6 so that, upon any relative movement between the shoes and housing, frictional forces will be created on the surfaces 13 and 14 to increase the capacity of the side bearing as well as snub or dampen the compressive and release movements thereof. The shoes and housing are desirably, but not necessarily, of cast form, and in order to fill the intricacies of the cast surfaces so as to ensure interengagement of the entire area of the surfaces 13 and 14 as well as provide a lubricating medium to prevent the surfaces from adhering or sticking, vertically spaced, horizontally extending recesses, wells or reliefs 15 opening toward the end walls 6 are provided in each shoe flange to retain or accommodate lead inserts or any other similar material. It will be noted that the end walls 6 are of increased thickness, that is to say, they are considerably thicker than the side walls so as to compensate for wear thereof during service and also to extend the serviceability or life of the side bearing.

In order to resiliently resist the downward or vertical movement of the shoes and also return the shoes to their normal or elevated position after a compressive movement of the side bearing, a resilient means, preferably in the form of a coil or helical spring 16, is arranged or disposed within each shoe and reacts vertically against the housing plate 3 and shoe closing wall 11. Substantially the entire portion of each helical spring 16 is encased by the associated cup-shaped shoe, and for this reason no additional means are necessarily required to retain the coil springs in operable position, but in anticipation of spring failure and the possibility of the lowermost convolution of the spring shifting horizontally from its original position to lie within the path of the descending shoe flange to defeat the successful operation of the side bearing, upstanding convolutions, dowels or embossments 3' are formed on the lower plate 3 of the housing to extend within the springs 16 and thereby center or positively retain the springs within the confines of the friction shoes.

Each shoe depending flange, for preferably the upper half portion 17 thereof, is desirably of substantially square tubular configuration in horizontal cross section to conform with the shoe closing wall 11 and present an inwardly facing plane surface 17$^a$ the purpose of which will be hereinafter explained. This construction permits the closing wall 11 to be formed square or substantially so and thereby present an upwardly facing and appreciable bearing area. So as to lessen or decrease the weight of the shoes the lower half portion 17$^b$ of the depending shoe flanges and particularly that portion thereof facing inwardly of the side bearing is formed substantially semi-cylindrical to follow in spaced relation the contour of the encased spring 16.

Figure 1:
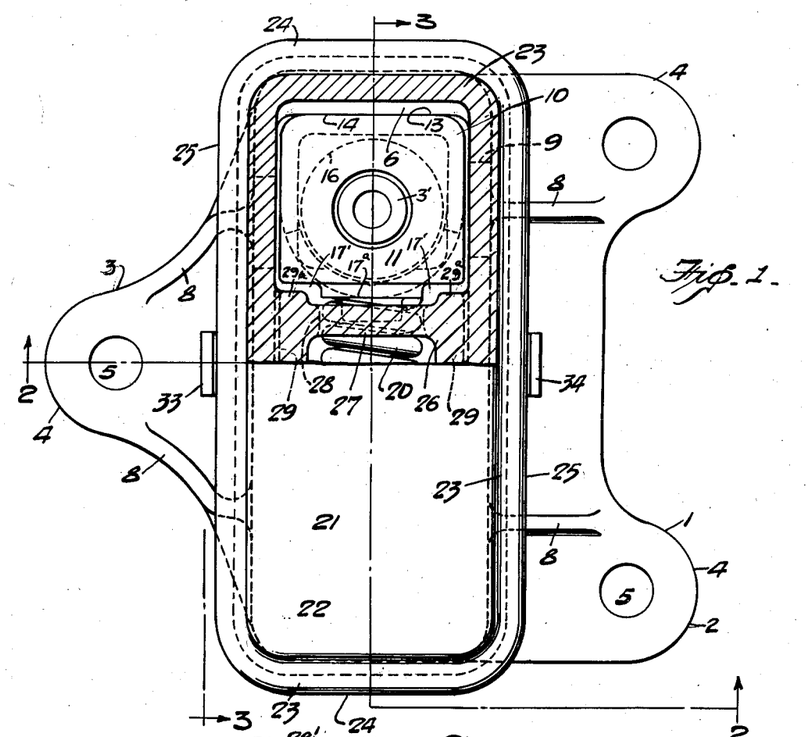
Figure 1 shows a partial plan view and a partial horizontal sectional view of a side bearing embodying a form of the invention.
Figure 2:
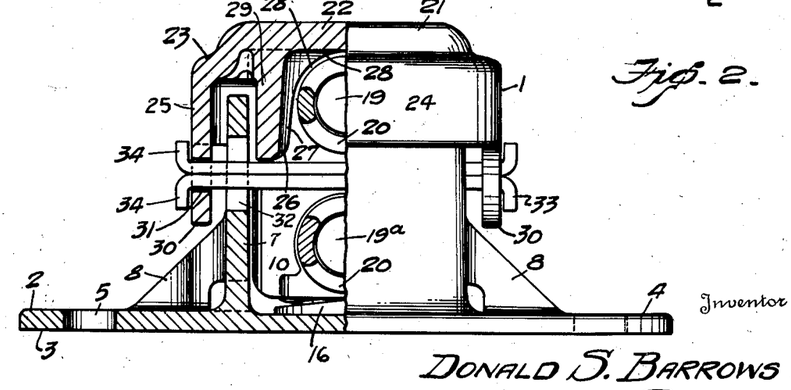
Figure 2 is a partial end elevational view and a a partial vertical cross-sectional view taken along the lines 2—2 of Figure 1 looking in the direction of the arrows.
Figure 3:
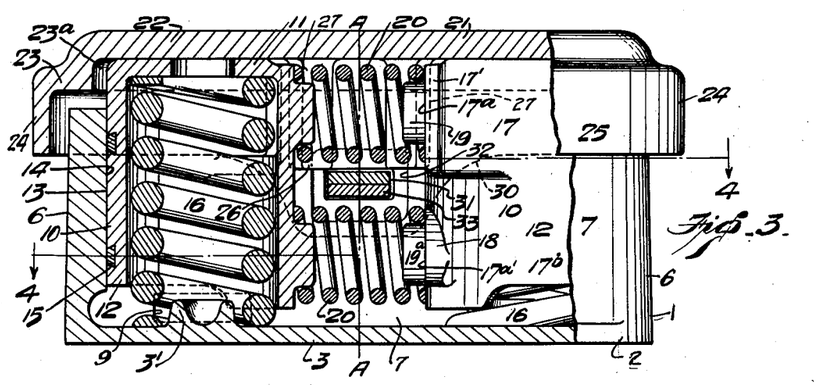
Figure 3 is a view taken along the lines 3—3 of Figure 1 looking in the direction of the arrows; a portion of the view being illustrated in section and the remainder in elevation to more clearly disclose the relation and association of parts.
Figure 4:
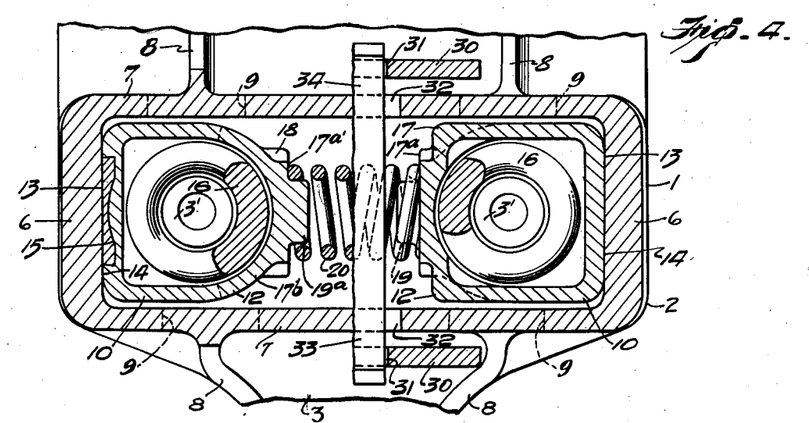
Figure 4 is a horizontal sectional view taken along the lines 4—4 of Figure 3 looking in the direction of the arrows.
Figure 5:
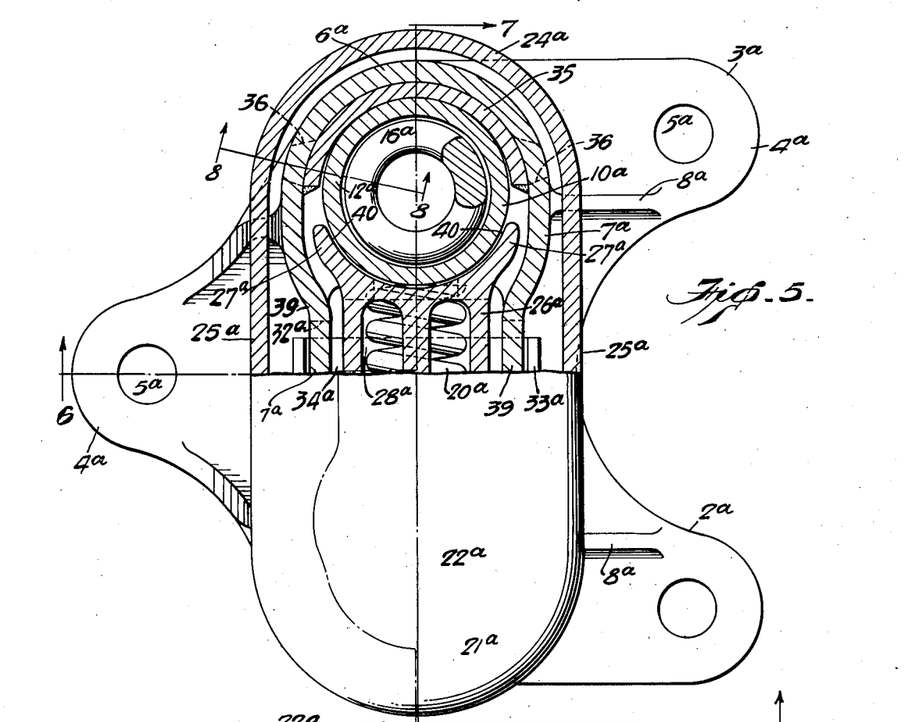
Figure 5 is a partial plan and partial horizontal sectional view of a side bearing differing somewhat from the side bearing illustrated in Figures 1 to 4 and embodying another form of the invention.
Figure 6:
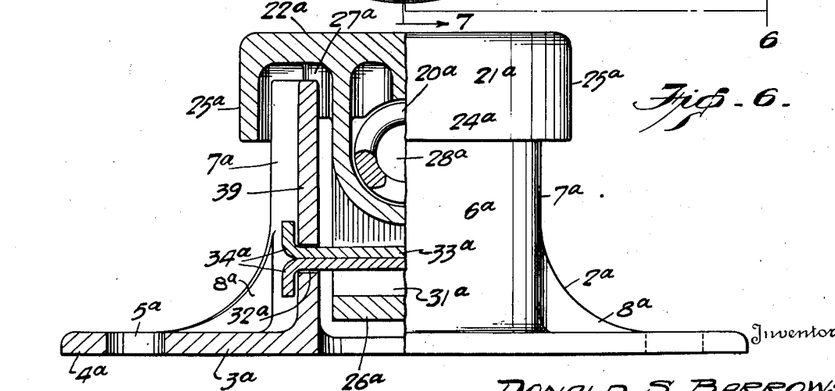
Figure 6 is a partial end elevational and partial vertical sectional view of the side bearing illustrated in Figure 5 and is taken along the lines 6—6 of Figure 5 looking in the direction of the arrows.
Figure 7:
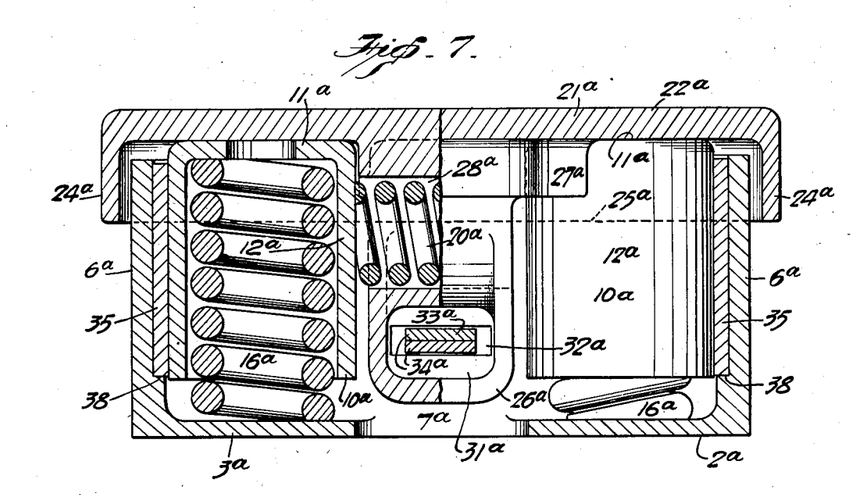
Figure 7 is a vertical sectional view taken along the lines 7—7 of Figure 5 looking in the direction of the arrows.
Figure 8:
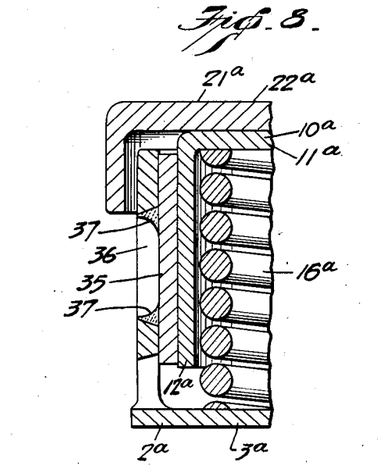
Figure 8 is a sectional view taken along the lines 8—8 of Figure 5 looking in the direction of the arrows.

Each shoe is provided with a shoulder, annular ledge or substantially circular abutment 18 formed on the semi-cylindrical portion 17$^b$ of the depending flange 12 and opposed from the surface 13 to be directed inwardly of the side bearing or toward or facing the transverse vertical plane of the side bearing which is indicated in Figure 3 by the diagrammatic line "A—A". The shoulders present confronting bearing surfaces 17$^{a\prime}$ which are in substantially vertical alignment with the bearing surfaces 17$^a$. Extending toward the transverse vertical plane of the side bearing from the shoe depending flanges are vertically spaced cylindrical nibs, convolutions or horizontally directed dowels 19 and 19$^a$, the former or upper of which project from the bearing surface 17$^a$ and the latter or lower of which are associated with the shoulders and preferably coaxial therewith. By this arrangement, therefore, the dowels of the shoes are directed toward or face one another and accordingly present centering means for vertically spaced longitudinally acting spring or resilient means of any character and which, in the illustrated structure, preferably take the form of coil or helical springs 20. The resilient means 20, being interposed between the friction shoes and movable vertically therewith, are in intimate contact with the bearing surfaces 17$^a$ and 17$^{a\prime}$ and urge the shoes apart longitudinally of the side bearing to force the shoe surfaces 13 against the housing surfaces 14.

The side bearing is provided with a top member, cap or cover 21 which comprises a wear or top plate 22 normally positioned in vertically spaced relation to, and preferably of greater horizontal extent than, the subjacent housing walls to form a bearing plate to be engaged by a suitable member or body side bearing (not shown) associated with a body bolster (not shown). The top plate is offset downwardly adjacent its periphery, as at 23, to form a downwardly facing relief or recess 23a for the reception of the upper extremities of the friction shoes. The offset portion is also spaced above and in substantially vertical alignment with the housing walls, and the distance in which the offset is spaced from the housing is determinative of the amount of compressive movement in the side bearing from the illustrated normal position. This distance may be varied as desired or as the associated bolster structures require. The cap top plate spans or bridges across and bears directly upon the underlying friction shoe closing walls so that when the plate is urged vertically by an associated body side bearing, both shoes will be forced or moved downwardly, compressing the supporting or associated coil springs 16 and creating frictional forces acting on the surfaces 13 and 14 by virtue of the relative movement between the shoes and housing.

Depending from adjacent the edges of the top plate are longitudinally spaced end flanges 24 connected by transversely spaced side flanges 25 which overlap the upper extremities and are positioned outwardly of associated housing end walls and side walls, respectively. By reason of this arrangement the cap 21 completely covers the clear opening into the housing and thereby prevents or arrests the entrance of foreign substance to within the side bearing. As previously indicated, sufficient clearance is provided between the cap flanges and associated housing walls to permit the cap to assume an abnormal position or angular relationship with respect to the housing and thereby impart a desired degree of flexibility to the side bearing structure. In spacing the cap flanges from the housing walls consideration is also given to prevent any contact or engagement therebetween during a vertical, lateral or longitudinal movement of the cap with respect to the housing. This is desirable so as to eliminate the otherwise occasional creation of forces which would vary the capacity of the side bearing and subject the cap flanges and housing walls to wear other than the intended wear of the housing end walls for which express provisions have been made.

Depending downwardly from the cap top plate to within the housing is a centrally disposed pendant 26 comprising transversely extending, substantially vertical end legs 27 spaced from but in close proximity to the surfaces 17a of the shoe depending flange. A slight clearance is provided between the pendant end legs and the associated shoe surfaces 17a to impart a desired degree of flexibility to the structure. This clearance is less than the distance between the end flanges and end walls, and hence the longitudinal movement of the cap relative to the housing is limited to the extent that the end flanges cannot engage the end walls. Inverted U-shaped apertures 28 are formed in the end legs to facilitate assembly of the cap with the associated structures and to accommodate the uppermost of the resilient means 20. The aperture defining portions of the end legs are desirably spaced a slight distance from the associated spring means, as indicated at 28', to allow the cap a predetermined range of transverse movement and still prevent the side flanges thereof from engaging the housing side walls during a relative transverse movement between the cap and housing. Connecting the end legs adjacent their transverse extremities are spaced substantially vertical side legs 29 which are spaced inwardly of the housing side walls and form reinforcements for the pendant end legs. The side legs are extended longitudinally beyond the transverse plane of the end legs to form fingers or abutments 29a projecting into suitably formed vertically extending transversely spaced recesses or reliefs 17' provided in the upper half portion 17 of each shoe. The abutments not only rigidify the pendant but present additional surfaces adapted to engage the shoes after a predetermined horizontal movement of the cap with respect to the housing.

Extending downwardly from the cap side flanges intermediate their ends and toward the housing bottom plate are extensions or arms 30 which are provided with apertures 31 adjacent the free extremities thereof. The apertures 31 are in substantial horizontal alignment with, but of lesser vertical and horizontal extent than, elongated apertures 32 provided in the housing side walls intermediate their height. Extending transversely of the side bearing and horizontally between the spring means 20 is a key or retaining means 33 which is movable with the cap and functions as a means for retaining the elements of the side bearing in assembled relation. The retaining means is desirably formed of two counterpart strips or bars 34 projecting through the housing wall apertures 32 and occupying the cap arm apertures 31. The bars have their extremities, which are positioned outwardly of the cap arms, spread apart or directed away from one another to prevent an unwarranted removal or accidental displacement thereof. Due to the close proximity of the bars to the springs 20 and their attachment to the cap side flanges, the housing apertures 32 are elongated a distance above and below the illustrated normal position of the key and accordingly the side bearing is free to expand or be compressed from normal position. The apertures 32 are also elongated a desirable distance horizontally, as most clearly illustrated in Figures 3 and 4 of the drawings, so as to prevent interference between the key and housing during a longitudinal movement of the cap with respect to the housing.

By now referring to the second embodiment of the invention illustrated in Figures 5 to 8 of the drawings, the illustrated exemplified side bearing, which is also of the resilient type, comprises a housing or casing 2a opening upwardly and closed adjacent the lower extremity thereof by a horizontal bottom or lower plate 3a. The lower plate has portions thereof extending beyond the casing to provide attaching ears 4a which are apertured, as at 5a, for the application or reception of securing means of any nature.

Adjacent the extremities of the lower plate are vertically disposed longitudinally spaced end walls 6a which are desirably of cylindrical form and have their ends joined by substantially plane and vertical side walls 7a which are spaced transversely of the housing to complete the casing. Triangular-shaped gussets 8a extend between the lower plate and side walls to rigidify the housing structure.

In a resilient side bearing of the type illustrated it may at times be found desirable to provide removable wear plates with the assembly so that, after a prolonged use of the side bearing, the plates may be renewed and thereby renovate or recondition the bearing to extend the effective usefulness thereof. The housing of the instant structure is desirably of cast form, and by associating wear plates with the portion thereof which is subjected to excessive wear, the life of the housing, and consequently the side bearing, may be extended indefinitely. With this thought, therefore, in mind the housing of the instant structure is arranged with cylindrically formed bearing or wear plates 35 fabricated from a rolled plate or section of tubing, preferably semi-circular in horizontal cross section and which are associated and desirably co-axial with the end walls presenting inwardly facing cylindrical concave surfaces. At substantially the junctures of the end and side walls the housing or casing is provided with vertically extending elongated apertures or slots 36 extending through the walls to thereby expose an elongated portion of the wear plates adjacent each extremity thereof. The slots are preferably formed with wall defining portions inclined inwardly of the casing to present undercut reliefs, recesses or indentures for the reception of welds 37 to thereby secure or bind the wear plates to the housing. When the wear plates have worn to such a degree that they warrant replacement, the welds may be chiseled away or removed in any convenient manner and new wear plates secured to the housing. Each end wall is provided with a shoulder or ledge 38 extending inwardly of the housing and in underlying supporting relation to the associated wear plate, and in this manner the welds securing the wear plates to the housing are relieved of stresses which tend to move the wear plates in a vertical direction as well as relieve the welds of forces to which they might otherwise be subjected.

Associated with the housing adjacent each end thereof is a tubular inverted cup-shaped friction member, block or shoe 10$^a$ desirably of cylindrical form and comprising an apertured upper or closing wall 11$^a$ having a peripheral depending continuous flange 12$^a$. The flange 12$^a$ is desirably substantially coaxial with the wear plate 35 to present a cylindrical convex outer surface which is in bearing relation with the concave inner surface of the associated wear plate so that an appreciable area of contact will be effected between the shoes and wear plates. By reason of this particular construction, therefore, a greater frictional area may be provided between the shoes and housing than in the previously described structure. The top wall 11$^a$ of each shoe is normally positioned in a plane above the upper extremity of the housing for the purpose which will be hereinafter explained, and the associated peripheral flange terminates short of the housing lower plate 3$^a$ in order to permit a downward movement of the shoes during a compressive movement of the side bearing. The shoes of the present structure may be of cast form or, as clearly understood, each may comprise a section of commercial tubing to form the peripheral flange 12$^a$ and a fabricated disk or washer welded to an end thereof to complete the shoe detail, or the shoe may be drawn from a flat plate as a pressing.

Resilient means is associated with each shoe to resist the downward movement thereof during a compressive movement of the side bearing as well as return the shoe to its elevated or normal position when relieved of a superimposed load. The resilient means may be of any character and, as illustrated, takes the form of a helical or coil spring 16$^a$ extending within and substantially entirely encased by the associated shoe to react in a vertical direction against the housing lower plate 3$^a$ and the shoe top wall 11$^a$. No additional means are employed or required in the instant structure to retain the springs 16$^a$ in an operable or predetermined position, which assists in materially lessening the ultimate weight of the side bearing.

Forming an upper closing member for the side bearing is a cover or cap 21$^a$ which comprises a bearing or top plate 22$^a$ normally positioned in a horizontal plane above the upper extremity of the housing walls and directly supported by the shoe top walls 11$^a$. By this arrangement, therefore, any load or forces applied to the top plate will move the shoe downwardly, and this shoe movement will be resiliently resisted by the springs 16$^a$ to cushion the compressive movement of the side bearing. The top plate desirably extends horizontally beyond the limits of the housing and has, depending from adjacent spaced longitudinal edges thereof, cylindrically formed end flanges 24$^a$ which are substantially coaxial with and spaced from the associated housing end walls 6$^a$. The transverse edges of the top plate are provided with depending side flanges 25$^a$ spaced from the associated housing side walls and connecting the edges or forming continuations of the end flanges 24$^a$. The cap flanges form a protective means to exclude water or foreign substance from the interior of the side bearing, and by being spaced a suitable distance from the housing walls the cap is allowed to assume an abnormal relation with respect to the subjacent housing and associated instrumentalities to incorporate a desired degree of flexibility in the side bearing.

The cap is provided with a depending means or pendant 26$^a$ interposed between and normally spaced longitudinally from the shoes to allow the cap to move longitudinally with respect to the housing. The side walls are indented inwardly of the housing or convoluted, as at 39, and the pendant 26$^a$ is accordingly of lesser dimension than the distance between the convolutions to thereby allow the cap to move in a transverse direction relatively to the housing. The pendant, adjacent its juncture with the top plate, is provided with oppositely directed arcuate extensions or fingers 27$^a$, each having a concave surface 40 thereof spaced from the adjacent shoe and substantially coaxial therewith, to limit the relative horizontal, transverse or longitudinal movement between the cap and shoes. By this arrangement and relation of shoes and concave surfaces 40, the cap end and side flanges 24$^a$ and 25$^a$ will be, at all times, maintained in spaced relation to the associated housing end and side walls 6$^a$ and 7$^a$, respectively, while the cap is allowed a limited horizontal movement with respect to the housing.

Extending longitudinally of the side bearing is a horizontally disposed opening 28$^a$ positioned in the upper portion of the pendant in the close proximity to the extensions to form a conduit for a longitudinally directed and acting spring or resilient means which, in the instant structure, is represented by a coil or helical spring 20$^a$. The helical spring, which moves vertically with the shoes, is positioned intermediate the height of the shoes and serves to urge them apart into intimate contact with the wear plates 35, and by reason of this arrangement any compressive movement of the side bearing will create frictional forces acting on the cylindrical engaging surfaces of the wear plates and shoes to increase the compressive value of the side bearing.

Positioned adjacent the lower extremity of the pendant 26ᵃ is a transversely disposed elongated aperture 31ᵃ spaced below the opening 28ᵃ in substantial alignment with apertures 32ᵃ provided in the housing side walls adjacent their lower extremities. A key or retaining means 33ᵃ in the form of two counterpart plates or bars 34ᵃ projects through the pendant aperture 31ᵃ and the housing apertures 32ᵃ to have their ends extend beyond the housing and bent or disposed in opposite directions to interlock the bars with the housing and thereby retain them in operable position. It will be noted that the retaining means in the instant structure remains stationary with respect to the housing and the pendant aperture 31ᵃ is extended above and below the retaining means so as to permit the cap to move in a vertical direction relatively to the housing during a compressive or expansive movement of the side bearing.

Figure 9:
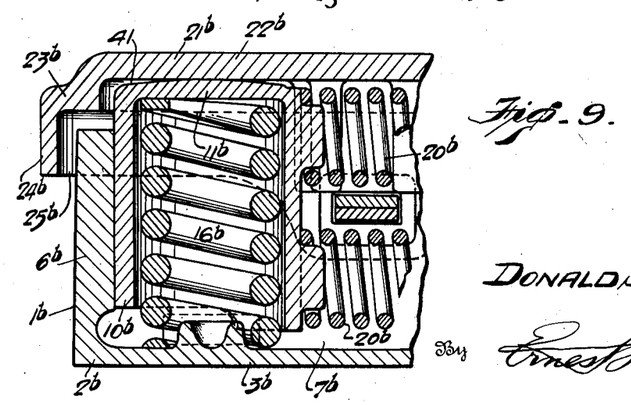
Figure 9 is a vertical sectional view disclosing a construction somewhat similar to that of Figure 3 but showing a modification thereof.

Referring to Figure 9 of the drawings wherein a third embodiment of the invention is illustrated, the numeral 1ᵇ indicates a side bearing also of the resilient type and comprising an upwardly opening casing or housing 2ᵇ. Only a portion of the side bearing is illustrated, it being understood that, unless expressly stated to the contrary, the instant structure is or may be identical with the structure of either Figures 1 to 4 or that of Figures 5 to 8. The housing desirably comprises a bottom wall 3ᵇ having upstanding therefrom end walls 6ᵇ joined by side walls 7ᵇ only one each of which is shown. Positioned within the housing are transversely spaced, vertically movable inverted cup-shaped blocks or shoes 10ᵇ, only one of which is illustrated, which are resiliently supported by any type of vertically acting resilient means, such as the illustrated coil spring 16ᵇ, the latter of which is housed or encased by the associated shoe. The shoes, like those of the first-described structure, are urged longitudinally of the side bearing into intimate contact with the housing end walls by means of vertically spaced helical or coil springs 20ᵇ.

Supported by an upper closing wall 11ᵇ of each shoe is a cap or cover 21ᵇ having an upper plate portion 22ᵇ which is provided adjacent its periphery with a downwardly offset portion 23ᵇ normally in vertical spaced relation with the underlying housing walls an amount sufficient to allow a downward movement of the cap with respect to the housing during a compressive movement of the side bearing. The offset portion terminates in downwardly directed end flanges 24ᵇ and side flanges 25ᵇ which are spaced a desired distance from the associated end walls and side walls, respectively, to allow the cap to move relatively to the housing without any interference therebetween.

In order to overcome the necessity of constructing the cap top plate and shoe closing walls so as to insure a surface bearing relation therebetween while at the same time insuring surface bearing between the engaging surfaces of the shoes and housing end walls, the closing wall of each shoe is arcuate or crowned so as to present a convex surface 41 which may be either cylindrical or spherical as desired. It will be noted that by thus forming the cap engaging surface of the shoes the cap will be free to assume an abnormal relation with respect to the housing without creating any forces which might defeat a surface bearing relation between the shoes and housing end walls. It will be further noted that in the absence of a crowned shoe surface unless the cap engaging surface of the shoe closing plate and the end wall engaging surface of the shoe flange are perpendicular to each other at a true and right angle, there will not be a full surface bearing relation existing between the shoes and cover and housing. The construction of the instant structure presents either a line contact, if a cylindrical surface is employed, or a point contact, if a spherical surface is employed, between the cap and the shoes which will greatly add to the flexibility of the structure and eliminate any possibility of the associated elements of the side bearing assuming any other than their normal relation.

It may at times be found desirable to alter or rearrange the illustrated constructions, and it will be noted that any changes in detail or construction may be easily made to the exemplified forms of the invention without departing from within the spirit and scope of the appended claims.

I claim:

1. In a side bearing, in combination, a housing having spaced end walls joined by spaced side walls, shoes positioned in said housing, vertically acting spring means urging said shoes outwardly of said housing, horizontally acting spring means interposed between said shoes urging them into engagement with said end walls, and a cap having a portion thereof normally spaced above said housing walls and bearing upon said shoes.

2. In a side bearing, in combination, a housing having vertically disposed end walls, longitudinally spaced shoes interposed between said end walls, vertically acting spring means urging said shoes outwardly of said housing, longitudinally acting spring means urging said shoes into intimate contact with said end walls for the frictional engagement thereof during relative movement between said shoes and housing, and a top plate normally spaced from said end walls and bearing upon said spaced shoes.

3. In a side bearing, in combination, a housing having vertically disposed end walls, longitudinally spaced shoes interposed between said end walls, vertically acting spring means urging said shoes outwardly of said housing, vertically spaced longitudinally acting spring means urging said shoes into intimate contact with said end walls for the frictional engagement thereof during relative movement between said shoes and housing, and a top plate normally spaced from said end walls and bearing upon said shoes; said top plate being removably associated with said housing.

4. In a side bearing, in combination, a housing having spaced end walls joined by spaced side walls, shoes positioned in said housing, coil springs urging said shoes outwardly of said housing, a coil spring interposed between said shoes urging them apart into engagement with said end walls, and a cap having a portion thereof normally spaced from said end walls and bearing upon said shoes.

5. In a side bearing, in combination, a housing having spaced end walls joined by spaced side walls, shoes positioned in said housing, coil springs positioned within and urging said shoes outwardly of said housing, a vertically movable longitudinally acting coil spring interposed between said shoes urging them apart into engagement with said end walls, and a cap having a portion thereof normally spaced from said walls and bearing upon said shoes; said cap being removably associated with said walls.

6. In a side bearing, in combination, a housing comprising spaced end walls joined by spaced side walls, shoes positioned in said housing, arcuate surfaces on said shoes, spring means acting between said housing and shoes for urging the latter vertically, resilient means associated with said shoes and movable therewith for urging them into bearing relation with said end walls, and means normally spaced from said walls and bearing on said arcuate surfaces of said shoes for imparting a degree of flexibility to said side bearing.

7. In a side bearing, in combination, a housing longitudinally spaced shoes positioned in said housing, resilient means associated with each shoe urging it outwardly of the housing, vertically spaced spring means movable with and interposed between said shoes urging them into bearing relation with said housing, a cap having a portion thereof normally spaced above said housing and bearing upon said shoes, and means extending transversely of said housing between said spring means; said means projecting through apertures in said housing and cap and removably securing said cap and housing together.

8. In a side bearing, in combination, a housing, longitudinally spaced cup-shaped shoes positioned in said housing, spring means positioned in said shoes urging them outwardly of said housing, spring means interposed between said shoes urging them into engagement with said housing, and cap means having a portion thereof normally spaced from said housing and bearing upon said shoes.

9. In a side bearing, in combination, a housing, longitudinally spaced shoes positioned in and having portions thereof extending outwardly of said housing, spring means reacting against said housing and shoes for urging the latter outwardly of the former, vertically spaced spring means interposed between said shoes forcing them into bearing relation with said housing, a cap comprising a top plate bearing upon said shoes in spaced relation to said housing, and means extending horizontally between said spring means and through apertures in said cap and housing for retaining said side bearing in assembled relation.

10. In a side bearing, in combination, a housing, longitudinally spaced inverted cup-shaped shoes positioned in said housing, spring elements partially within said shoes reacting against said shoes and housing, vertically spaced resilient means interposed between said shoes for forcing them into bearing relation with said housing, a cap superimposed upon said shoes and having flange portions positioned outwardly of said housing, and means extending between said resilient elements and through apertures in said housing and flange portions for retaining said side bearing in assembled relation; said housing apertures extending above and below the normal position of said means to allow a compressive or expansive movement of said side bearing.

11. In a side bearing, in combination, a housing, longitudinally spaced inverted cup-shaped shoes positioned in said housing, coil springs partially within said shoes and urging them outwardly of said housing, coil springs interposed between said shoes forcing them longitudinally into bearing relation with said housing so as to create frictional forces on engaging surfaces of said shoes and housing upon relative movement therebetween, a plate normally spaced above said housing and bridging said shoes in bearing relation therewith, side flanges depending from said top plate overlying said housing in spaced relation, and means extending horizontally through apertures in said housing and side flanges for removably securing said side bearing in assembled relation.

12. In a side bearing, in combination, a housing open at one end, shoes positioned in and extending partially outwardly of the open end of said housing, said shoes each comprising a horizontal closing wall and a continuous depending flange, recesses in said flanges opening toward said housing, a material of different character from said shoes positioned in said recesses, spring means partially within the confines of said depending flanges reacting against said housing and shoe closing walls for urging said shoes outwardly of said housing, means on said shoe flanges directed toward one another, resilient means retained in operable position by said means and urging said recessed portion of said flanges against said housing, and plate means normally spaced above said housing and bearing against said shoes for urging them inwardly of the housing.

13. In a side bearing, in combination, a housing, longitudinally spaced cup-shaped shoes positioned in said housing and movable relatively thereto, spring means positioned in said shoes urging them outwardly of said housing, a top plate normally spaced above said housing and bearing upon said shoes, a pendant extending downwardly from said top plate into said housing, an aperture in said pendant, and spring means positioned in said aperture and reacting against said shoes for urging said shoes longitudinally of said side bearing into intimate contact with said housing.

14. In a side bearing, in combination, a housing, longitudinally spaced cylindrical shoes positioned in said housing, coil springs positioned in said shoes reacting against said shoes and housing, a top plate extending across and bearing upon said shoes, means depending from said top plate intermediate said shoes, and a coil spring associated with said means reacting longitudinally of said side bearing to thereby urge said shoes against said housing for the frictional engagement thereof during a relative movement between said shoes and housing.

15. In a side bearing, in combination, a housing, longitudinally spaced inverted cup-shaped shoes positioned in said housing and movable relatively thereto, coil springs positioned in said shoes urging them outwardly of said housing, a cap having a top plate normally spaced above said housing and bearing upon said shoes, a peripheral flange extending downwardly from said top plate and overlying said housing in spaced relation thereto, a pendant extending downwardly from said top plate into said housing, a longitudinally disposed aperture in said pendant, spring means positioned in said aperture and reacting against said shoes for urging them longitudinally of said side bearing into intimate contact with said housing, a transversely disposed aperture in said pendant, and means extending through said transverse aperture and apertures in said housing for retaining said side bearing in assembled relation.

16. In a side bearing, a housing having cylindrically disposed end walls, a cylindrical shoe associated with each end wall, spring means reacting against a top portion of each shoe and said housing for urging the former outwardly of the latter, a top plate normally spaced above said housing and bearing upon said shoes, means depending from said top plate, and spring means associated with said means and reacting against said shoe for urging them into intimate contact with said end walls for creating frictional engagement between said shoes and end walls during relative movement therebetween.

17. In a side bearing, in combination, a housing having circular end walls, a circular wear plate secured to each of said end walls, an inverted cup-shaped member associated with each wear plate, spring means positioned within each member for urging it outwardly of said housing, spring means interposed between and urging said members against said wear plates for creating frictional forces therebetween upon relative movement thereof, and a cap removably associated with and having a portion thereof normally spaced above said housing.

18. In a side bearing, in combination, a housing having spaced cylindrical end walls joined by spaced side walls, a cylindrical wear plate welded to each of said end walls, an inverted cup-shaped shoe associated with each wear plate, a coil spring housed by each shoe for urging the latter outwardly of the housing, a coil spring interposed between said shoes for forcing them into bearing relation with said wear plates, a cap superimposed upon said shoes and normally spaced above said housing, means depending from said cap to within said housing, and additional means associated with said first-named means and said side walls for retaining the side bearing in assembled relation.

19. In a side bearing, in combination, a housing having spaced cylindrical end walls joined by spaced side walls, a cylindrical wear plate substantially coaxial with and welded to each of said end walls, a cylindrical shoe substantially coaxial with each wear plate, spring means reacting against each shoe and said housing for urging said shoes outwardly of the housing, spring means interposed between said shoes for forcing them apart into bearing relation with said wear plates, a cap bearing upon said shoes and normally spaced above said housing, means depending from said cap to within said housing, and additional means removably associated with said first-named means and said side walls for retaining the side bearing in assembled relation.

20. In a housing for a side bearing, in combination, a bottom plate having vertically disposed, longitudinally spaced, cylindrical end walls, substantially plane side walls joining said end walls, vertically disposed apertures adjacent the juncture of said end and side walls, cylindrical wear plates associated with said end walls inwardly of said housing, and welds positioned in said apertures for securing said wear plates to said housing.

21. In a side bearing, in combination, a housing having spaced cylindrical end walls joined by spaced side walls, a cylindrical wear plate substantially coaxial with and secured to each end wall, a cylindrical shoe substantially coaxial and associated with each wear plate, spring means reacting against each shoe and said housing for urging said shoes outwardly of the housing, a cap bearing upon said shoes and having a portion thereof spaced above said housing, means depending from said cap to within said housing, cylindrical surfaces on said means substantially coaxial with and spaced from said shoes for limiting horizontal movement of said cap with respect to said housing, and spring means associated with said depending means for urging said shoes into engagement with said wear plates.

22. In a side bearing, in combination, a housing, longitudinally spaced cup-shaped shoes positioned in said housing and movable relatively therto, spring means associated with said shoes urging them outwardly of said housing, spring means interposed between said shoes forcing them apart into intimate contact with said housing, a movable cap having a plate portion normally spaced above said housing and bearing upon said shoes, a flange adjacent the periphery of said plate overlying said housing in spaced relation thereto, and means extending from said top plate to within said housing, said means being adapted to engage said shoes for limiting horizontal movement of said cap and retaining said flange out of contact with said housing.

DONALD S. BARROWS.